(12) United States Patent
Miyashita (10) Patent No.: US 8,310,352 B2
(45) Date of Patent: Nov. 13, 2012

(54) RELAY APPARATUS, COMMUNICATION SYSTEM, AND COMMUNICATION METHOD

(75) Inventor: Yukihiro Miyashita, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 514 days.

(21) Appl. No.: 12/450,581

(22) PCT Filed: Aug. 22, 2008

(86) PCT No.: PCT/JP2008/064998
§ 371 (c)(1),
(2), (4) Date: Oct. 1, 2009

(87) PCT Pub. No.: WO2009/025353
PCT Pub. Date: Feb. 26, 2009

(65) Prior Publication Data
US 2010/0079265 A1 Apr. 1, 2010

(30) Foreign Application Priority Data
Aug. 22, 2007 (JP) .................................. 2007-216391

(51) Int. Cl.
*H04B 3/36* (2006.01)
(52) U.S. Cl. ............... 340/425.2; 340/425.5; 340/426.1; 340/5.4; 340/5.6; 340/10.2; 340/10.4; 370/389; 370/401; 370/451; 370/462; 455/18; 455/403
(58) Field of Classification Search ............... 340/425.2, 340/425.5, 426, 5.4, 5.6, 10.2, 10.4, 13.6; 370/389, 401, 451, 462; 455/18, 403
See application file for complete search history.

(56) References Cited

U.S. PATENT DOCUMENTS

| | | | |
|---|---|---|---|
| 6,360,152 B1 | 3/2002 | Ishibashi et al. | |
| 6,967,969 B2 * | 11/2005 | Kikkawa et al. | ............... 370/451 |
| 7,203,580 B2 * | 4/2007 | Ban et al. | ..................... 701/29.1 |
| 2007/0133578 A1 * | 6/2007 | Tani | ............................. 370/401 |

FOREIGN PATENT DOCUMENTS

| | | |
|---|---|---|
| EP | 1 037 430 A1 | 9/2000 |
| JP | A-3-25046 | 2/1991 |
| JP | B2-2851003 | 1/1999 |
| JP | A-2000-284808 | 10/2000 |
| JP | A-2002-204249 | 7/2002 |
| JP | 2003-152762 A | 5/2003 |
| JP | A-2005-159568 | 6/2005 |
| WO | WO 99/22494 | 5/1999 |
| WO | WO 2007/043608 A1 | 4/2007 |

OTHER PUBLICATIONS

Office Action issued Apr. 3, 2012 in Japanese Patent Application No. 2007-216391 (with English Translation).

* cited by examiner

*Primary Examiner* — Tai T Nguyen
(74) *Attorney, Agent, or Firm* — Oliff & Berridge, PLC (57) ABSTRACT

While ECUs are connected with a distribution apparatus via a communication line, each of the ECUs sends status notification representing own status to the distribution apparatus. The distribution apparatus creates status information representing status of the ECUs in accordance with status notifications received from the ECUs connected with the distribution apparatus. This status information is sent to other distribution apparatuses together with data for synchronizing a database. The other ECUs perform similar operations to those of the ECUs, while the other distribution apparatuses perform similar operations to those of the distribution apparatus. Therefore, each of the distribution apparatuses can recognize the status of all the ECUs.

14 Claims, 9 Drawing Sheets

| CONNECTED DESTINATION | STATUS | GROUP 1 | GROUP 2 |
|---|---|---|---|
| DISTRIBUTION APPARATUS 1a | SLEEP POSSIBLE STATUS | 1 | 0 |

F I G. 7

| CONNECTED DESTINATION | STATUS | GROUP 1 | GROUP 2 |
|---|---|---|---|
| DISTRIBUTION APPARATUS 1a | SLEEP POSSIBLE STATUS | 1 | 0 |
| DISTRIBUTION APPARATUS 1b | SLEEP POSSIBLE STATUS | 1 | 0 |
| DISTRIBUTION APPARATUS 1c | SLEEP POSSIBLE STATUS | 1 | 0 |

RELAY APPARATUS, COMMUNICATION SYSTEM, AND COMMUNICATION METHOD

This application is the national phase under 35 U.S.C. §371 of PCT International Application No. PCT/JP2008/064998 which has an International filing date of Aug. 22, 2008 and designated the United States of America.

BACKGROUND OF THE INVENTION

1. Field of the Invention

The present invention relates generally to a communication system where a plurality of communication apparatuses are connected to a plurality of communication lines respectively, in particular, to a relay apparatus making a communication apparatus detect an operation status of another communication apparatus connected to another communication line and controlling the communication apparatus in accordance with the operation status of another communication apparatus; communication system including the relay apparatus; and a communication method with using the relay apparatus.

2. Description of Related Art

It is recently known in several fields to utilize a system having many communication apparatuses, in which each communication apparatus is provided a certain function and connected with other communication apparatuses in order to perform variable operations through data exchange between many communication apparatuses. For example, it is known in a field of local area network (LAN) adapting for car to utilize electronic control units (ECUs) as the communication apparatuses, to make each ECU perform a certain operation and to exchange data between the ECUs, in order to provide various functions to be implemented by a system.

A number and a type are increased of the communication apparatuses connected to a communication medium in a system, proportionally to a specializing degree of the function provided to each communication apparatus, as well as an increasing degree of the functions performed by the system. Furthermore, the system is expected to perform much more various functions. Thus, each communication apparatus is required to share data and to interact with other communication apparatuses. Then, it results in an increase of exchanged data amount.

To accommodate the increase of exchanged data amount, communication apparatuses of the system is generally divided into some groups, and then each group is connected to a communication medium. This configuration can reduce communication traffic volume because of reducing the number of communication apparatuses connected to the communication medium. Thus, this configuration can prevent data collision and the like. Furthermore, it is thought to focus on data type treated by the groups of communication apparatus, and then to connect each group to each of communication mediums respectively having different communication speed. In such a configuration, a group treating a predetermined data type is connected with another group treating another predetermined data type, by a gateway apparatus that controls data transmission.

Japanese Patent Application Laid-Open No. 2005-159568 discloses that: ECUs in a field of LAN adapting for car are divided into some groups; each group is connected to each of communication lines of car; the communication lines of car are connected to each other by a gateway apparatus; priority information is added to the received and transmitted data to recognize data priority; the data priority is recognized through the priority information and the data having high priority is preferentially transmitted when the gateway apparatus performs data transmission between different communication lines of car, to prevent a transmission delay of data having high priority even when the communication lines of car take increased duty for data transmission.

SUMMARY OF THE INVENTION

In a case of connecting each group of communication apparatuses to each of different communication lines and relaying data transmission by a gateway apparatus, it is thought to divide the groups of communication apparatuses on the basis of a physical organization and a functional organization. Even in such a configuration, two communication apparatuses having the same functional attribute are not always connected to the same communication line. The two communication apparatuses may be connected to different communication lines when a physical placement is preferentially considered.

When the two communication apparatuses having the same functional attribute are required to interact with each other but are connected to different communication lines, it is difficult for one of the communication apparatuses to directly detect an operation status of the other communication apparatus.

The present invention was made in view of such circumstances, and has a primary object to provide: a relay apparatus that relays data transmitted between communication apparatuses which are connected to different communication lines respectively, that receives a status notification for notifying an operation status of a communication apparatus sent from the communication apparatus connected to a communication line, and that sends status information representing the operation status of the communication apparatus to another communication apparatus connected to another communication line, in order to control each communication apparatus connected to a communication line in accordance with the operation status of another communication apparatus connected to another communication line; communication system including the relay apparatus; and a communication method with using the relay apparatus.

Another object of the present invention is to provide a relay apparatus that relays data transmitted between communication apparatuses which are connected to different communication lines respectively, that receives a status notification for notifying an operation status of a communication apparatus sent from the communication apparatus connected to a communication line, and that sends a directive for performing an operation to another communication apparatus connected to another communication line with the relay apparatus in accordance with the status notification, in order to make each communication apparatus connected to a communication line interact with another communication apparatus connected to another communication line.

Another object of the present invention is to provide a relay apparatus that relays data transmitted between communication apparatuses which are connected to different communication lines respectively, that receives a sleep notification for notifying a operational plan leading a sleep status to a communication apparatus sent from the communication apparatus connected to a communication line, that determines whether it is possible to make the communication apparatus become in the sleep status in accordance with an operation status of another communication apparatus connected to another communication line, and that sends a directive for leading the sleep status when it is determined to be possible to make the communication apparatus become in the sleep status, in order to make each communication apparatus connected to a communication line become in the sleep status while interacting with another communication apparatus connected to another communication line.

Another object of the present invention is to provide a relay apparatus that becomes in a sleep situation when sending a directive for leading the sleep status to a communication apparatus connected to a communication line, in order to make many communication apparatuses interact together and become in the sleep status as a entire system.

Another object of the present invention is to provide a relay apparatus that relays data transmitted between communication apparatuses which are connected to different communication lines respectively, that receives an activation notification for an activation of one or more communication apparatuses sent from the one or more communication apparatuses, and that sends outside a directive for leading activation when receiving the activation notification, in order to activate communication apparatuses and another relay apparatus.

A relay apparatus according to first aspect of the present invention is connected to a plurality of external devices connected to a plurality of communication lines, receives data from the plurality of external devices, relays data received from an external device connected to a communication line toward another external device connected to another communication line, and comprises: a means for receiving a status notification from each external device connected to a communication line; and a means for sending status information based on the status notification outside.

A relay apparatus according to second aspect of the present invention comprises a means for determining whether a directive for performing a predetermined operation should be sent in accordance with status information of the plurality of external devices toward one or more external devices.

A relay apparatus according to third aspect of the present invention comprises: the status notification having a notification that represents whether the external device can become in a sleep status or not; a means for determining whether one or more external devices can become in the sleep status or not in accordance with status notification representing whether plural external devices can become in the sleep status or not; and a means for notifying the one or more external devices to become in the sleep status, when it is determined that the one or more external devices can become in the sleep status.

A relay apparatus according to fourth aspect of the present invention comprises a means for making the relay apparatus become in a sleep situation, when each external device connected to the respective communication line is notified to become in a sleep status.

A relay apparatus according to fifth aspect of the present invention comprises: the status notification having a notification that represents start-activation of the external device; and a means for notifying activation information outside, when the notification representing start-activation is received from one or more external devices.

A communication system according to sixth aspect of the present invention comprises: a plurality of communication apparatuses connected to a plurality of communication lines; a plurality of relay apparatuses according to any one of first to fifth aspect of the present invention, wherein each of the relay apparatuses receives a status notification from each of the communication apparatuses, and sends status information based on the received status notification being sent from the each of the communication apparatuses toward other relay apparatus.

A communication method according to seventh aspect of the present invention utilizes a communication system having a plurality of communication apparatuses connected to a plurality of communication lines and a plurality of relay apparatuses connected to the plurality of communication lines for relaying data between communication apparatuses connected to different communication lines, wherein each of the communication apparatuses sends own status notification to the relay apparatus connected with the each of the communication apparatuses via a communication line; and each of the relay apparatuses: receives the status notification from plural communication apparatuses; sends status information representing a status of the communication apparatus in accordance with the status notification toward other relay apparatuses; determines whether a directive for performing a predetermined operation should be notified to one or more communication apparatuses among the communication devices connected with the each of the relay apparatuses or not in accordance with status information sent from other relay apparatus; and notifies the directive for performing the predetermined operation to the one or more communication devices, when it is determined to notify the directive for performing the predetermined operation.

In accordance with an aspect of the present invention, a relay apparatus relays data transmitted between communication apparatuses connected to different communication lines respectively. A status notification sent from a communication apparatus is received by the relay apparatus, and then a status information representing an operation status of the communication apparatus is sent to another communication apparatus or outside, such as another relay apparatus. The status notification may be sent from a plurality of communication apparatuses, and then the status information may be sent to a plurality of different communication apparatuses.

In accordance with another aspect of the present invention, a directive for performing a predetermined operation is sent, as needed, to one or more communication apparatuses in accordance with status information representing operation status of plural communication apparatuses.

In accordance with another aspect of the present invention, a status notification sent from a communication apparatus may include a notification about a sleep status. It is determined whether one or more communication apparatuses can become in a sleep status or not, in accordance with notifications about a sleep status sent from plural communication apparatuses. When it is determined that the one or more communication apparatuses can become in a sleep status, a directive for leading a sleep status is sent to the one or more communication apparatuses.

In accordance with another aspect of the present invention, the relay apparatus becomes in a sleep situation when sending the directive for leading a sleep status to each communication apparatus connected with the relay apparatus via each communication line in order to lead a sleep status.

In accordance with another aspect of the present invention, a status notification sent from a communication apparatus may include a notification about starting activation. When one or more communication apparatuses have sent the notification about start-activation to a reply apparatus, a directive for starting activation is sent by the relay apparatus to another communication apparatus connected to another communication line, in order to activate the entire system. In the case that the system includes a plurality of relay apparatuses, the relay apparatus received the notification about start-activation sends the directive for starting activation to another replay apparatus, in order to activate the entire system.

An aspect of the present invention leads advantages that each communication apparatus can detect an operation status of another communication apparatus connected to another communication line and interact with the another communication apparatus on the basis of the operation status of the another communication apparatus, because a relay apparatus relays data transmitted between communication apparatuses connected to different communication lines respectively and status information representing operation status of each communication apparatus is sent through the relay apparatus to other apparatus.

Another aspect of the present invention leads advantages that a relay apparatus, relaying data transmitted between communication apparatuses connected to different communication lines respectively, can send a directive for performing a predetermined operation to a communication apparatus in accordance with the operation status of another communication apparatus connected to another communication line in order to make communication apparatuses interact with each other.

Another aspect of the present invention leads advantages that one or more communication apparatuses can be in a sleep status on the basis of the status of different communication apparatuses connected to different communication lines respectively. For example, in order to lead a sleep mode to communication apparatuses having the same functional attribute, it is possible to determine whether these communication apparatuses can be currently in the sleep mode or not and to make these communication apparatuses become in the sleep mode on the basis of the determination while making these communication apparatuses interact with each other.

Another aspect of the present invention leads advantages that entire system can be changed into a sleep condition.

Another aspect of the present invention leads advantages that each reply apparatus and each communication apparatus can be activated when at least one of communication apparatuses is activated, because communication apparatuses and relay apparatuses are activated in accordance with the activation of one or more communication apparatuses.

Thus, it is possible to change the entire system automatically from an activation condition into a sleep condition, or from the sleep condition into the active condition. Therefore, it is possible to save electric power consumption of the entire system.

The above and further objects and features of the invention will more fully be apparent from the following detailed description with accompanying drawings.

DESCRIPTION OF THE PREFERRED EMBODIMENT

Hereinafter, an embodiment of the present invention is described in detail with reference to drawings. In this embodiment, a communication system according to the present invention is described in the context of a communication system adapting for car and being suitable for a LAN adapting for car connected a plurality of ECUs to send and receive data.

Figure 1:
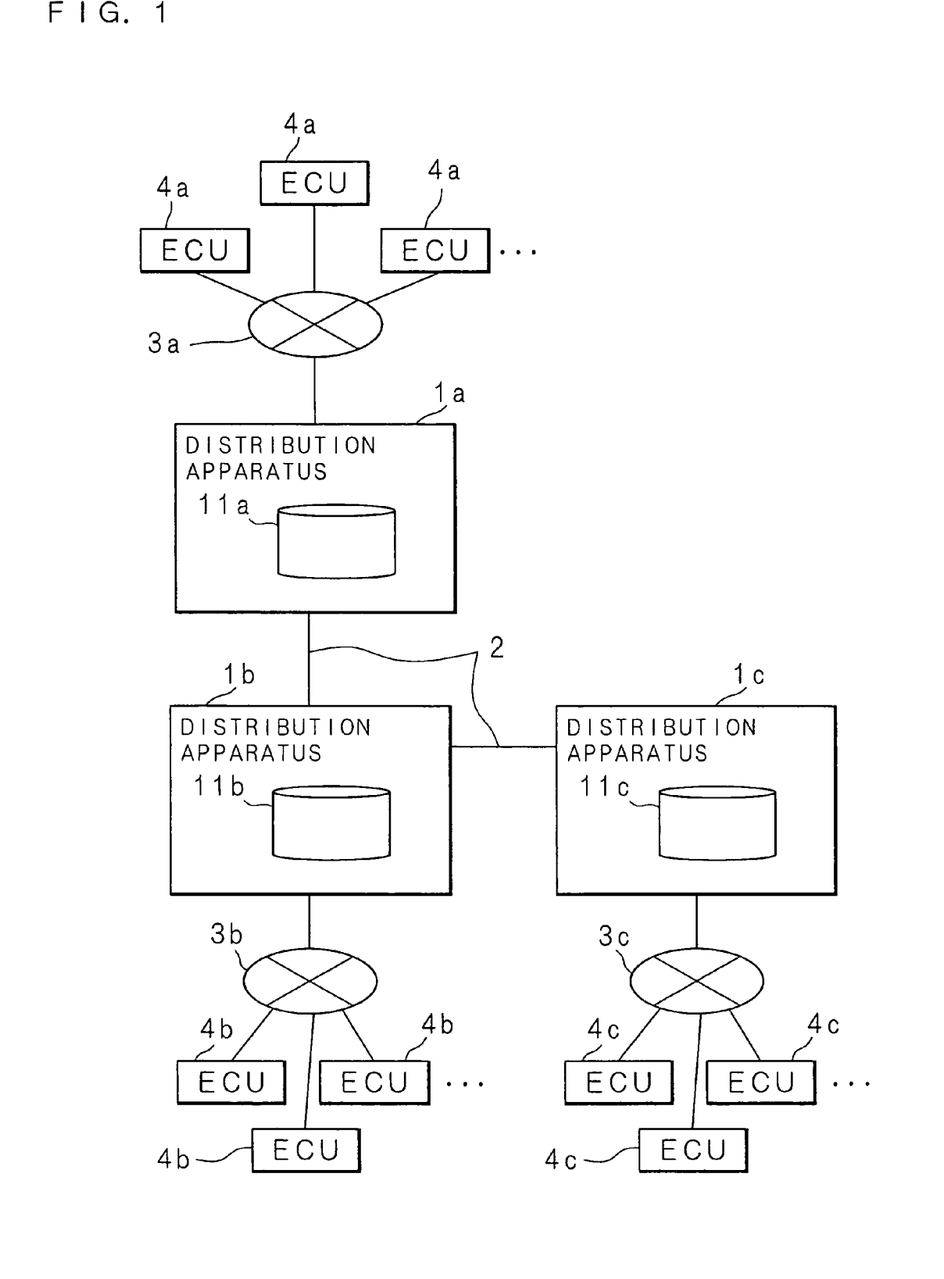
FIG. 1 is a block diagram showing components of a communication system adapting for car according to an embodiment.

FIG. 1 is a block diagram showing components of the communication system adapting for car according to the embodiment. The communication system adapting for car is configured with: electronic control units (ECUs) $4a$, $4a$, ..., $4b$, $4b$, ..., $4c$, $4c$, ..., as communication apparatuses, that are divided into some groups and respectively send and receive data; communication lines $3a$, $3b$, $3c$ connected to the ECUs $4a$, $4a$, ..., $4b$, $4b$, ..., $4c$, $4c$, ... for each group to communicate all the ECUs of each group; distribution apparatuses $1a$, $1b$, $1c$, as relay apparatuses, that relay data transmitted between the ECUs $4a$, $4a$, ..., $4b$, $4b$, ..., $4c$, $4c$, ..., store the transmitted data, and distribute the transmitted data to the ECUs $4a$, $4a$, ..., $4b$, $4b$, ..., $4c$, $4c$, ...; and a communication line 2 connecting the distribution apparatuses $1a$, $1b$, $1c$ together.

The communication system adapting for car of the embodiment has a trunking type network. In the communication system, the distribution apparatuses $1a$, $1b$, $1c$ are connected to the communication line 2 (one trunk), and the ECUs $4a$, $4a$, ..., $4b$, $4b$, ..., $4c$, $4c$, ... are divided into some groups through the distribution apparatuses $1a$, $1b$, $1c$.

In the embodiment, the distribution apparatuses $1a$, $1b$, $1c$ are connected with each other in a daisy chain method through the communication line 2. Connections between the ECUs $4a$, $4a$, ..., $4b$, $4b$, ..., $4c$, $4c$, ... may be a bus topology, star topology, daisy chain topology or the like, as well as connections between the ECUs $4a$, $4a$, ..., $4b$, $4b$, ..., $4c$, $4c$, ... and the distribution apparatuses $1a$, $1b$, $1c$.

Each of the distribution apparatuses $1a$, $1b$, $1c$ includes a storage region, working as a database $11a$, $11b$, $11c$. Basically, the distribution apparatus $1a$ stores data transmitted from the ECUs $4a$, $4a$, ... into the database $11a$, and sends data being read out from the database $11a$ toward the ECUs $4a$, $4a$, ....

The ECUs $4a$, $4a$, ..., $4b$, $4b$, ..., $4c$, $4c$, ... can send data including numerical information of several physical quantities, such as measured values, computed values and control values. Furthermore, the ECUs $4a$, $4a$, ..., $4b$, $4b$, ..., $4c$, $4c$, ... can associate with a microcomputer for an engine, brake or the like. For example, an ECU 4a is connected with a sensor (not shown) for detecting rotation speeds of wheels (wheel speed), and works as an antilock brake system (ABS). The ECU 4a controls the brake in accordance with the wheel speed detected through the sensor during braking time of the car, and sends data including measured values of the wheel speed to the distribution apparatus 1a.

Although a class of ECUs 4a, 4a, . . . , a class of ECUs 4b, 4b, . . . and a class of ECUs 4c, 4c, . . . respectively have different functions, among all the ECU 4a, 4a, . . . , 4b, 4b, . . . , 4c, 4c, . . . , all the ECUs having the same functional attribute are not always connected to the same communication line. An ECU is determined to connect to which communication line because of physical constraints such as whether the installation location of ECU 4a is close or far. Thus, an ECU 4a having a function for detecting remote keys may be connected to the communication line 3a and an ECU 4c having a function for controlling key locking and key unlocking may be connected to the communication line 3c, for example, although this ECU 4a corresponds to the same function about key locking as the ECU 4c.

Therefore, the ECU 4b, 4b, . . . and the ECU 4c, 4c, . . . connected to other communication lines 3b, 3c may require to use data stored in the database 11a, while the database 11a stores data transmitted from the ECU 4a, 4a, . . . and is renewed by the distribution apparatus 1a each time when the distribution apparatus 1a receives data from the ECU 4a, 4a, . . . .

In view of such circumstances, the distribution apparatus 1a stores data transmitted from the ECU 4a, 4a, . . . not only in the database 11a but also in the database 11b of the distribution apparatus 1b and the database 11c of the distribution apparatus 1c, and sends the data from the distribution apparatuses 1b, 1c to ECUs 4b, 4b, . . . , 4c, 4c, . . . . In short, each of the distribution apparatuses 1a, 1b, 1c sends the data transmitted from the ECUs 4a, 4a, . . . , the ECUs 4b, 4b, . . . , or the ECUs 4c, 4c, . . . toward other distribution apparatus 1a, 1b, 1c that stores the data in own database 11a, 11b, 11c. These configurations synchronize data stored in the databases 11a, 11b, 11c, each other. Therefore, these configurations lead advantages to make the ECUs 4a, 4a, . . . , 4b, 4b, . . . , 4c, 4c, . . . respectively connected to different communication lines 3a, 3b, 3c share the same data.

In these configurations, the distribution apparatuses 1a, 1b, 1c send data to the ECUs 4a, 4a, . . . , 4b, 4b, . . . , 4c, 4c, . . . after storing the data. Therefore, it is possible to optimize the timing for transmitting data from the distribution apparatuses 1a, 1b, 1c to the ECUs 4a, 4a, . . . , 4b, 4b, . . . , 4c, 4c, . . . , on the basis of the operation status of each ECU 4a, 4a, . . . , 4b, 4b, . . . , 4c, 4c, . . . . Furthermore, it is possible to transmit from the distribution apparatuses 1a, 1b, 1c data combined with another data, on the basis of the operation status of each ECU 4a, 4a, . . . , 4b, 4b, . . . , 4c, 4c, . . . . Moreover, it is possible to transmit data computed by the distribution apparatuses 1a, 1b, 1c, on demand. Thus, data can be efficiently transmitted from the distribution apparatuses 1a, 1b, 1c, and the communication lines 3a, 3b, 3c can take reduced duty for data transmission.

In these configurations, ECUs 4a, 4b, 4c having the same functional attribute can use the same data even when the ECUs 4a, 4b, 4c are respectively connected to different communication lines 3a, 3b, 3c. However, each of the ECUs 4a, 4b, 4c cannot directly detect another ECU among the ECUs 4a, 4b, 4c even when the ECUs 4a, 4b, 4c are required to interact with each other, because the ECUs 4a, 4b, 4c are respectively connected to different communication lines 3a, 3b, 3c.

In view of such circumstances, the distribution apparatuses 1a, 1b, 1c of the embodiment receive notifications from the ECUs 4a, 4a, 4b, 4b, . . . , 4c, 4c, . . . , in addition to sending and receiving data in order to synchronize the databases 11a, 11b, 11c. Because these notifications are for notifying own status, the ECUs 4a, 4a, . . . , 4b, 4b, . . . , 4c, 4c, . . . can recognize status of another ECU among the ECUs 4a, 4a, . . . , 4b, 4b, . . . , 4c, 4c, . . . .

In addition, the ECUs 4a, 4a, . . . , 4b, 4b, . . . , 4c, 4c, . . . may be divided into some groups on the ground, for example, whether the ECU should interact with another ECU or not. In the embodiment, the ECUs 4a, 4a, . . . , 4b, 4b, . . . , 4c, 4c, . . . are divided into two groups. The distribution apparatuses 1a, 1b, 1c can recognize the group of an ECU from which the notification for notifying own mode has been sent.

For example, when ECUs 4a, 4b, 4c being divided into the same group are in status that can lead sleep (quiescent) mode, the distribution apparatuses 1a, 1b, 1c share the information of the status and send directives for changing into sleep status toward the ECUs 4a, 4b, 4c. Therefore, the ECUs 4a, 4b, 4c can change into the sleep mode while interacting with each other.

As described above, the distribution apparatuses 1a, 1b, 1c included in the communication system adapting for car of the embodiment is able to make the ECUs 4a, 4b, 4c respectively connected to different communication lines 3a, 3b, 3c interact with each other. Hereinafter, it is described about structures and procedures of the ECU 4a, 4a, . . . , 4b, 4b, . . . , 4c, 4c, . . . and the distribution apparatuses 1a, 1b, 1c for implementing the ability described above.

Figure 2:
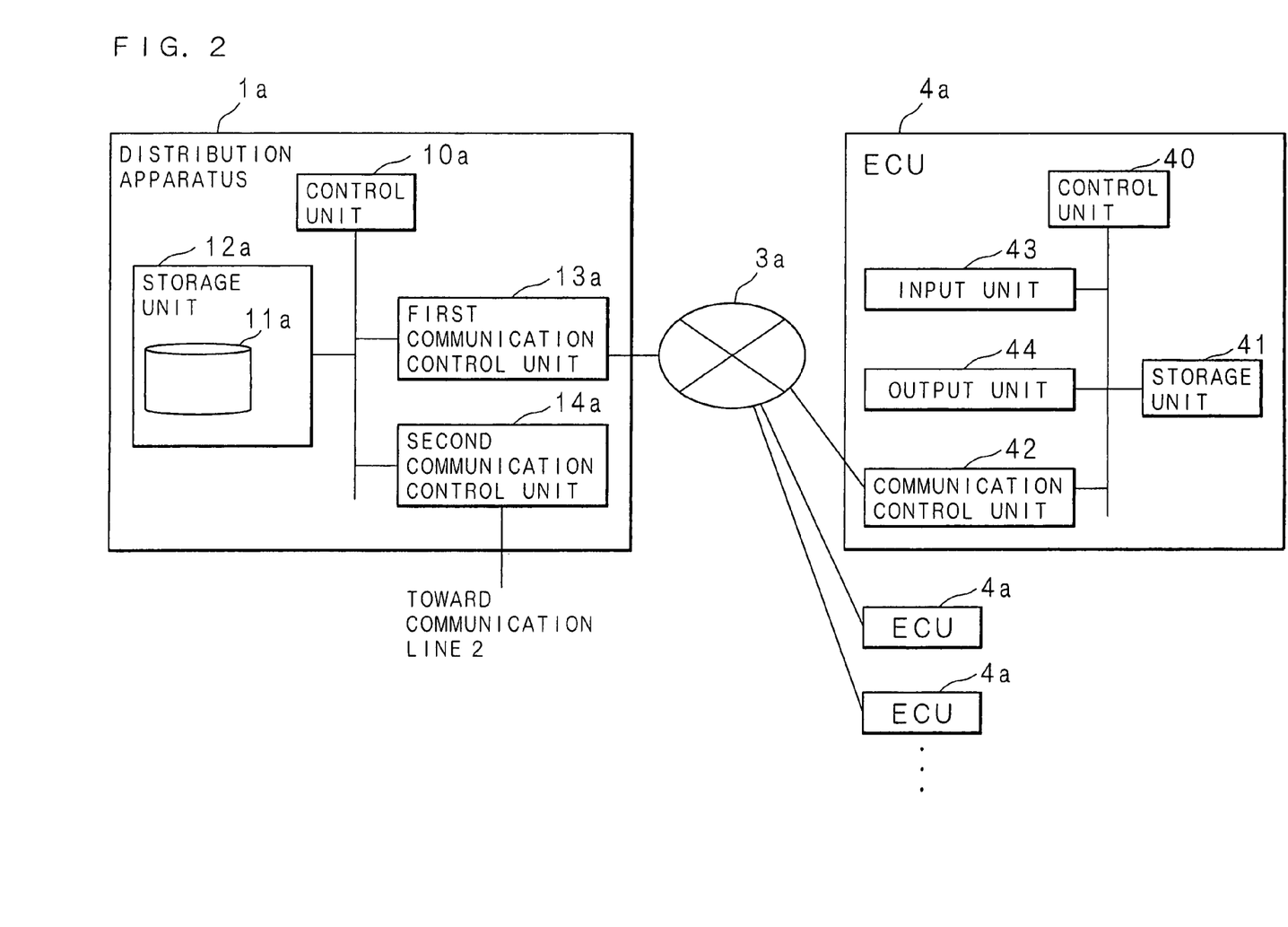
FIG. 2 is a block diagram showing inner components of a distribution apparatus and an ECU included in the communication system adapting for car according to the embodiment.

FIG. 2 is a block diagram showing inner components of the distribution apparatus 1a and the ECU 4a included in the communication system adapting for car according to the embodiment. The inner components of the distribution apparatus 1a are the same as those of the distribution apparatuses 1b, 1c. The inner components of the ECU 4a are the same as those of the ECUs 4b, 4c. Thus, the inner components of the distribution apparatuses 1b, 1c and ECUs 4b, 4c will not be illustrated and described in detail.

The distribution apparatus 1a includes: a control unit 10a that controls each component described bellow; storage unit 12a utilizing volatile memory; first communication control unit 13a connected to a communication line 3a; and a second communication control unit 14a connected to a communication line 2. The other distribution apparatuses 1b, 1c will not be described in detail, because having similar inner components as those of distribution apparatus 1a.

The control unit 10a is supplied with electric power from an electric power supply (not shown), such as an alternator or battery adapting for car, reads out a control program stored in nonvolatile inner memory (not shown), and executes the control program in order to control each component.

The storage unit 12a keeps a storage region for the database 11a storing data transmitted from the ECUs 4a, 4a, . . . . After receiving data, the control unit 10a picks up, for each data type such as "wheel speed", specific measured values, computed values and control values from received data and stores in the database 11a.

The first communication control unit 13a is connected with the ECUs 4a, 4a, . . . via the communication line 3a, and implements data transmission between the first communication control unit 13a and the ECUs 4a, 4a, . . . . The control unit 10a receives data from the ECUs 4a, 4a, . . . and sends data to the ECUs 4a, 4a, . . . through the first communication control unit 13a. In addition, the control unit 10a receives status notifications from the ECUs 4a, 4a, . . . through the first communication control unit 13a, as described later. Then, the control unit 10a sends to the ECUs 4a, 4a, ..., on demand, directives for performing a predetermined operation, such as changing into a sleep mode, changing from the sleep mode into active mode (activation), sending a specific data or performing a specific control.

The second communication control unit 14a is connected with the other distribution apparatuses 1b, 1c via the communication line 2, and implements data transmission between the second communication control unit 14a and the distribution apparatuses 1b, 1c. The control unit 10a sends data being read out from a common region 12a of the database 11a toward the other distribution apparatuses 1b, 1c through the second communication control unit 14a. In addition, the control unit 10a receives data from the other distribution apparatuses 1b, 1c through the second communication control unit 14a.

Furthermore, the control unit 10a creates status information representing operation status of the ECUs 4a, 4a, ... in accordance with the status notification sent from the ECUs 4a, 4a, .... Then, the control unit 10a adds the created status information to the data being read out from the database and sends the information together with the data through the second communication control unit 14a. The status information created by the control unit 10a will be described later (see FIG. 5).

The control unit 10a can recognize the group of ECU from which the status notification has been sent through the communication line 3a. Identification data about the group or about the ECU may be added to the status notification sent from the ECUs 4a, 4a, .... In the case that identification data about the ECU is added to the status notification, the storage unit 41 preferably stores correspondence information between the ECUs 4a, 4a, ... and the groups in advance, in order to make the control unit 10a recognize the group of ECU from which the status notification has been sent.

The ECU 4a includes: a control unit 40 that controls each component described bellow; storage unit 41 utilizing nonvolatile memory; communication control unit 42 connected to the communication line 3a; input unit 43 that inputs a signal from a sensor (not shown); and an output unit 44 that outputs a control signal to an object device to be controlled (not shown). The ECUs 4b, 4c will not be described in detail, because having similar components as those of ECU 4a. Anyway, the input unit 43 or the output unit 44 may be alternatively provided to one or more ECUs among the ECUs 4a, 4b, 4c.

The control unit 40 of the ECU 4a is supplied with electric power from an electric power supply (not shown), such as an alternator or battery adapting for car, reads out a control program stored in nonvolatile inner memory (not shown), and executes the control program in order to control each component.

The control unit 40 works as a timer on the basis of inner clock (not shown). Thus, the control unit 40 performs each operation periodically.

The control unit 40 has a function to change own operation status into different status. Thus, the control unit 40 can change by itself from an active mode for performing each operation into a sleep mode for ceasing operations of almost all of the components with remaining some components, or can change from the sleep mode into the active mode. A directive for changing status, which is sent from the distribution apparatus 1a, may trigger the change from the active mode into the sleep mode or from the sleep mode into the active mode. Switching on and off of a switch (not shown) connected to the ECU 4a may trigger the change from the active mode into the sleep mode or from the sleep mode into the active mode.

In addition, the control unit 40 has a function to send to the distribution apparatus 1a during the active mode periodically a status notification representing whether own mode can be changed into the sleep mode or not. The status notification includes identification information to discriminate itself from the other ECUs 4a, or includes identification information about own group.

In addition, the control unit 40 may have a function to send a wakeup notification (notification representing start-activation) as a status notification representing that own status changes into the active mode, when having detected the switching on, for example. The control unit 40 may have a function to send a status notification representing whether own status can allow performing an operation, such as sending specific data or controlling specific component.

The storage unit 41 temporally stores several information generated during the operation of the control unit 40 and, for example, measured values represented by a signal being input from a sensor (not shown).

The communication control unit 42 has a network controller chip or network control function and implements communicating with the communication line 3a. The control unit 40 of the ECU 4a detects a signal coming from a sensor (not shown) periodically, for example every microsecond, and sends data including numerical information of physical quantities represented by the detected signal through the communication control unit 42. Further, the control unit 40 of the ECU 4a receives data, notification and the like transmitted from the distribution apparatus 1a through the communication control unit 42.

The control unit 40 detects a signal representing measured values provided from a sensor (not shown) connected to the ECU 4a through the input unit 43, and sends a control signal to a controlled object device connected to the ECU 4a through the output unit 44.

The communication system adapting for car is configured as described above. It will be described about operations in the communication system: status notification sending operation from the ECUs 4a, 4a, ..., 4b, 4b, ..., 4c, 4c, ...; and respective operation where the distribution apparatuses 1a, 1b, 1c receives these status notifications, picks up data for synchronizing the databases 11a, 11b, 11c each other, receives the status information representing the mode of each of the ECUs 4a, 4a, ..., 4b, 4b, ..., 4c, 4c, ..., and sends the data for synchronizing and the status information to share.

Figure 3:
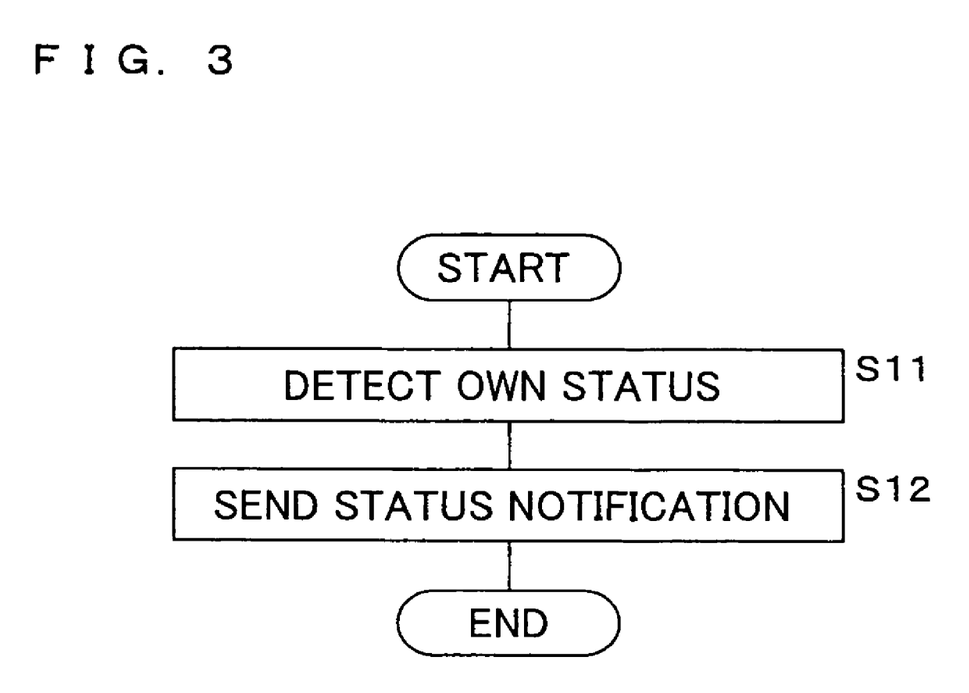
FIG. 3 is a flowchart showing one example of a procedure for sending a status notification by a control unit of an ECU included in the communication system adapting for car according to the embodiment.

Firstly, it will be explained about an operation to send the status notification from the ECUs 4a, 4a, ..., 4b, 4b, ..., 4c, 4c, .... FIG. 3 is a flowchart showing one example of a procedure for sending the status notification by the control unit 40 of the ECU 4a included in the communication system adapting for car according to the embodiment. This procedure is similar to those of the other ECUs 4a, 4a, ..., 4b, 4b, ..., 4c, 4c, .... Thus, these procedures of the other ECUs 4a, 4a, ..., 4b, 4b, ..., 4c, 4c, ... will not be explained in detail.

The control unit 40 of the ECU 4a detects own status (step S11), sends a status notification representing the detected own status (step S12) and completes this procedure. The status notification sent from the control unit 40 of the ECU 4a includes identification information of the ECU 4a itself, another identification information for identifying the contents of the status notification, and another information representing operable or not. Such another identification information for identifying the contents represents whether the status notification correspond to the possibility of change into the sleep mode or to the possibility of specific control.

The control unit 40 has a timer function to periodically repeat the steps S11 and S12 shown in the flowchart of FIG. 3. In addition, the control unit 40 performs an operation to send a status notification, similarly to the operation to send data including numerical information of several physical quantities, such as measured values, computed values and control values.

Figure 4:
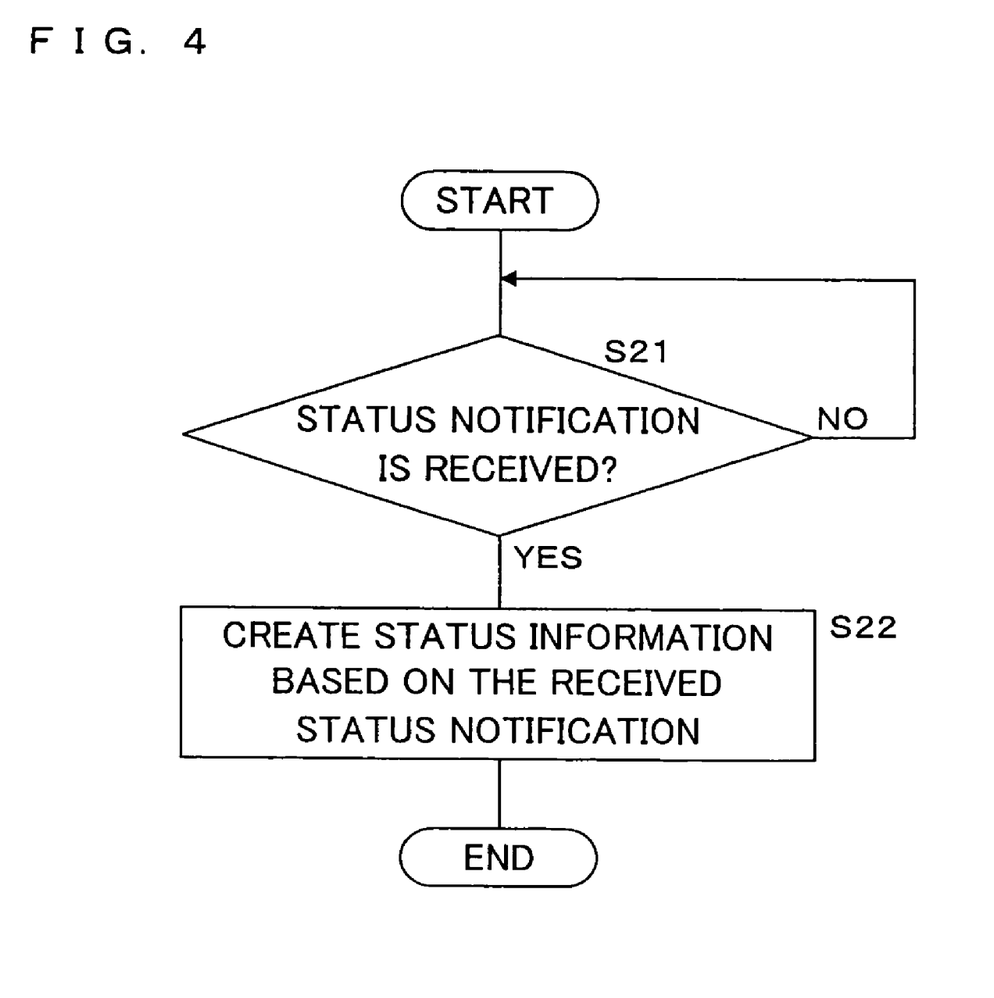
FIG. 4 is a flowchart showing one example of a procedure for receiving the status notification from the ECU by a control unit of a distribution apparatus included in the communication system adapting for car according to the embodiment.

FIG. 4 is a flowchart showing one example of a procedure that the status notification sent from the ECU 4a is received by a control unit 10a of a distribution apparatus included in the communication system adapting for car according to the embodiment. This procedure is similar to those of the other control units 10b, 10c of the other distribution apparatuses 1b, 1c. Thus, these procedures of the other control units 10b, 10c of the other distribution apparatuses 1b, 1c will not be explained in detail.

The control unit 10a of the distribution apparatus 1a determines whether receiving a status notification sent from any one of the ECUs 4a, 4a, . . . connected via the communication line 3a, or not (step S21). When having determined that the status notification is not received (S21: NO), the control unit 10a returns the procedure to the step S21, and waits until having determined that the status notification is received.

When having determined that the status notification sent from any one of the ECUs 4a, 4a, . . . is received (S21: YES), the control unit 10a creates a status information based on the received status notification (step S22), and completes this procedure. The status information is for representing status of ECUs of each group.

The control unit 10a performs the operation to receive the status notification, similarly to the operation to receive data from each ECU. In short, the control unit 10a periodically repeats the procedure shown in the flowchart of FIG. 4, and receives status notifications from all the ECUs 4a, 4a, . . . connected through the communication line 3a during a periodic time. During waiting until having determined at the step S21 that the status notification is received, the control unit 10a performs an operation to make the distribution apparatus 1a change into a sleep mode, an operation to go back to the initial status when detecting malfunction, or the like.

Figure 5:
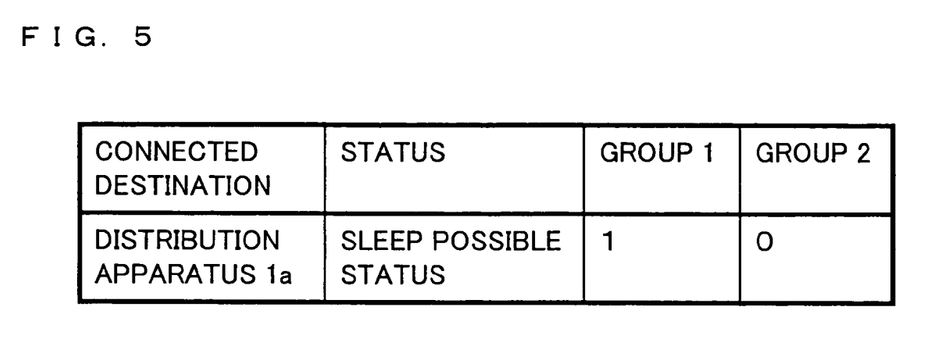
FIG. 5 is a table showing one example of status information representing status of ECUs and created by the control unit of the distribution apparatus included in the communication system adapting for car according to the embodiment.

FIG. 5 is a table showing one example of status information representing status of ECUs 4a, 4a, . . . and created by the control unit 10a of the distribution apparatus 1a included in the communication system adapting for car according to the embodiment. The table is shown to have information about an apparatus with which the ECUs 4a, 4a, . . . are connected, about mode represented by status information, and about actual mode of each group of ECUs 4a, 4a, . . . , for illustration purpose. In FIG. 5, the table represents for each group whether it is possible (numeric: 1) or impossible (numeric: 2) to make the ECUs 4a, 4a, . . . connected with the distribution apparatus 1a via the communication line 3a change into the sleep mode. In short, the table in FIG. 5 represents status of each group of the ECUs 4a, 4a, . . . , instead of individual status of the ECUs 4a, 4a, . . . . Thus, the numeric "1" is given to the table only when it is possible to make all the ECUs 4a, 4a, . . . in the same group among the ECUs 4a, 4a, . . . connected with the distribution apparatus 1a change into the sleep mode. When a group includes at least one ECU that is impossible to be changed into the sleep mode, the group is shown with numeric "0" as sleep impossible status. In other words, the table of FIG. 5 means that all the ECUs 4a, 4a, . . . of the group 1 are in the status being possible to change into the sleep mode, at least one of the ECUs 4a, 4a, . . . of the group 2 is in the status being impossible to change into the sleep mode, and then all the ECUs 4a, 4a, . . . of the group 2 cannot be changed into the sleep mode.

Each distribution apparatus 1a, 1b, 1c shares the status information illustrated in the table of FIG. 5 for the ECUs 4a, 4a, . . . , 4b, 4b, . . . , 4c, 4c, . . . connected to different communication lines 3a, 3b, 3c. Thus, each distribution apparatus 1a, 1b, 1c can determine whether all the ECUs 4a, 4a, . . . , 4b, 4b, . . . , 4c, 4c, . . . of the group 1 connected to different communication lines 3a, 3b, 3c are in the status being possible to change into the sleep mode, or not. When all the ECUs 4a, 4a, . . . , 4b, 4b, . . . , 4c, 4c, . . . of the group 1 are in the status being possible to change into the sleep mode, each of the distribution apparatuses 1a, 1b, 1c sends a directive for becoming into the sleep mode toward their own connected ECUs 4a, 4a, . . . , 4b, 4b, . . . , 4c, 4c, . . . of the group 1. Therefore, even when the ECUs 4a, 4a, . . . , 4b, 4b, . . . , 4c, 4c, . . . of the group 1 are connected to different communication lines 3a, 3b, 3c, the ECUs 4a, 4a, . . . , 4b, 4b, . . . , 4c, 4c, . . . of the group 1 can interact with each other and can be changed into the sleep mode in unison.

Secondly, it will be explained about an operation to send and receive data between the distribution apparatuses 1a, 1b, 1c in order to synchronize the databases 11a, 11b, 11c. For example, the distribution apparatus 1a sends both data for synchronizing and status information of the ECU 4a, 4a, . . . connected with the distribution apparatus 1a via the communication line 3a, and receives status information of the ECUs 4b, 4b, . . . , 4c, 4c, . . . connected to the other communication lines 3b, 3c from the other distribution apparatuses 1b, 1c.

Figure 6:
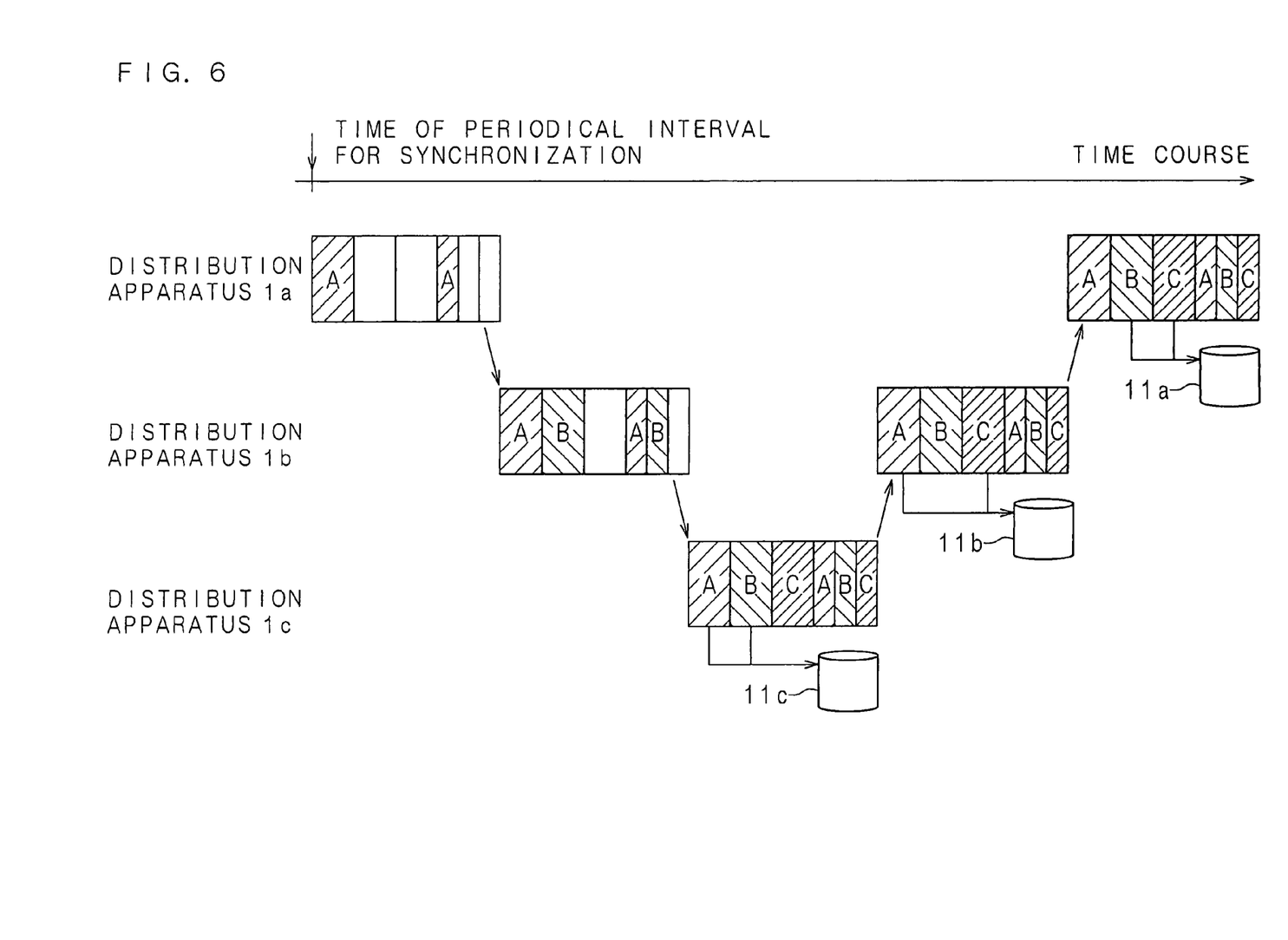
FIG. 6 is a schematic view showing data exchanged between the distribution apparatuses included in the communication system adapting for car according to the embodiment.

FIG. 6 is a schematic view showing data exchanged between the distribution apparatuses 1a, 1b, 1c included in the communication system adapting for car according to the embodiment. FIG. 6 shows time course at the horizontal axis, and schematically shows data and status information transmitted at each time point between the distribution apparatuses 1a, 1b, 1c. Each rectangle in FIG. 6 represents data and status information being read out from the databases 11a, 11b, 11c. The symbol "A" in each rectangle represents data constellation that is status information renewed by the distribution apparatus 1a. The symbols "B" and "C" in each rectangle represent data constellation that are status information renewed by the distribution apparatuses 1b and 1c, respectively.

Each distribution apparatus 1a, 1b, 1c sends data constellation being read out from each database 11a, 11b, 11c toward other distribution apparatuses 1a, 1b, 1c, basically at a periodic interval. In this embodiment, the period for synchronizing is, for example, 200 milliseconds.

The distribution apparatuses 1a, 1b, 1c of the embodiment are connected in daisy chain topologies, as described above. Thus, when the distribution apparatus 1a performs an operation shown in FIG. 6 to synchronize, the distribution apparatus 1a sends data constellation being read out from the database 11a toward the distribution apparatus 1b every time of a periodical interval for synchronization. At this time, the data constellation "A" is renewed by the distribution apparatus 1a, and then data including the data constellation "A" is transmitted from the distribution apparatus 1a to the distribution apparatus 1b. Furthermore, the distribution apparatus 1a sends to the distribution apparatus 1b both status information A created in accordance with the status notification received from the ECUs 4a, 4a, . . . and the data constellation being read out from the database 11a, together.

The distribution apparatus 1b overwrites the data transmitted from the distribution apparatus 1a with status information B created in accordance with both data constellation B being read out from the database 11b and status notification received from the ECUs 4b, 4b, . . . , and then sends the overwritten data to the distribution apparatus 1c. It should be noted that the distribution apparatus 1b is configured not to overwrite the region renewed by the distribution apparatus 1a with data and information.

Then, the distribution apparatus 1c overwrites the data transmitted from the distribution apparatus 1b with status information C created in accordance with both data constellation C being read out from the database 11c and status notification received from the ECUs 4c, 4c, . . . .

Through such operations performed by the distribution apparatuses 1a, 1b, 1c, each data constellation is transmitted from the distribution apparatus 1a to the distribution apparatus 1b, and from the distribution apparatus 1b to the distribution apparatus 1c, and has numerical information based on renewed databases 11a, 11b, 11c. Furthermore, the status information transmitted from the distribution apparatus 1a to the distribution apparatus 1b and from the distribution apparatus 1b to the distribution apparatus 1c represents current status of the ECUs 4a, 4a, . . . , 4b, 4b, . . . , 4c, 4c, . . . in the group 1 and the group 2 connected to the different communication lines 3a, 3b, 3c.

Then, the distribution apparatus 1c renews database 11c in accordance with the data constellation overwritten with the data constellation C being read out from the database 11c by itself. The distribution apparatus 1c may read out the data constellation A renewed by the distribution apparatus 1a and the data constellation B renewed by the distribution apparatus 1b and may renew the database 11c after overwriting with the data constellation C. Alternatively, the distribution apparatus 1c may read out the data constellation A renewed by the distribution apparatus 1a and the data constellation B renewed by the distribution apparatus 1b and may renew the database 11c before overwriting with the data constellation C. Furthermore, the distribution apparatus 1c stores in the storage unit 12c the mode information representing current status of the ECUs 4a, 4a, . . . , 4b, 4b, . . . , 4c, 4c, . . . in the group 1 and the group 2. The distribution apparatus 1c sends back to the distribution apparatus 1b the data constellation having all the numerical information based on renewed databases 11a, 11b; 11c.

Then, the distribution apparatus 1b renews the database 11b in accordance with the data constellation received from the distribution apparatus 1c. Further, the distribution apparatus 1b reads out status information transmitted together with the data constellation sent by the distribution apparatus 1c, and then stores the status information in the storage unit 12b. Furthermore, the distribution apparatus 1b sends the received data constellation to the distribution apparatus 1a.

The distribution apparatus 1a renews the database 11a in accordance with the data constellation received from the distribution apparatus 1b. Further, the distribution apparatus 1a reads out status information of the ECUs 4b, 4b, . . . , 4c, 4c, . . . that are transmitted together with the data constellation sent by the distribution apparatus 1b, and then stores the status information in the storage unit 12a.

The distribution apparatuses 1a, 1b, 1c perform the operations to receive and send the data constellation and the status information as shown in FIG. 6, every 200 milliseconds (the periodical interval of synchronization).

Therefore, each of the distribution apparatuses 1a, 1b, 1c respectively can detect the status of the ECUs 4a, 4a, . . . , 4b, 4b, . . . , 4c, 4c, . . . in each group connected to the different communication lines 3a, 3b, 3c.

Figure 7:
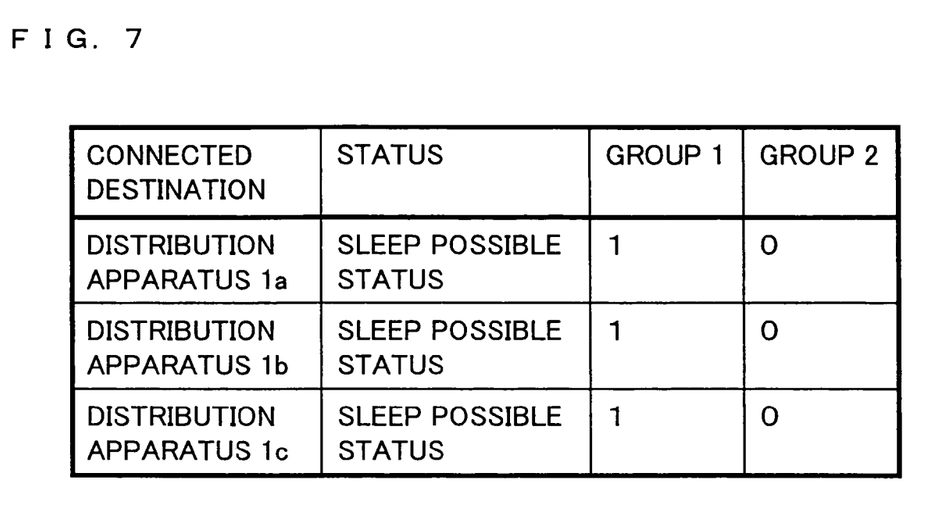
FIG. 7 is a table showing one example of status information shared between the distribution apparatuses, the status information being sent together with data by the distribution apparatuses.

FIG. 7 is a table showing one example of status information shared between the distribution apparatuses 1a, 1b, 1c. This status information is sent together with data by the distribution apparatuses 1a, 1b, 1c. Status information shown in FIG. 7 is created by combining each status information which is created by each distribution apparatus 1a, 1b, 1c as shown in FIG. 5. The databases 11a, 11b, 11c of the distribution apparatuses 1a, 1b, 1c are synchronized with using current data through the operations shown in FIG. 6. Additionally, the distribution apparatuses 1a, 1b, 1c can obtain the status information shown in FIG. 7, because each of the distribution apparatuses 1a, 1b, is respectively sends status information representing the status of their own connected ECUs 4a, 4a, 4b, 4b, . . . , 4c, 4c, . . . . Therefore, the distribution apparatuses 1a, 1b, 1c can detect the status of all the ECUs 4a, 4a, . . . , 4b, 4b, . . . , 4c, 4c, . . . for each group.

The table in FIG. 7 represents that all the ECUs 4a, 4a, . . . in the group 1 are in the sleep possible status "1" among the ECUs 4a, 4a, . . . connected to the communication line 3a, but that at least one of the ECUs 4a, 4a, . . . in the group 2 is in the sleep impossible status "0" among the ECUs 4a, 4a, . . . connected to the communication line 3a. Further, the table in FIG. 7 represents that all the ECUs 4b, 4b, . . . in the group 1 are in the sleep possible status "1" among the ECUs 4b, 4b, . . . connected to the communication line 3b, but that at least one of the ECUs 4b, 4b, . . . in the group 2 is in the sleep impossible status "0" among the ECUs 4b, 4b, . . . connected to the communication line 3b. Furthermore, the table in FIG. 7 represents that all the ECUs 4c, 4c, . . . in the group 1 are in the sleep possible status "1" among the ECUs 4c, 4c, . . . connected to the communication line 3c, but that at least one of the ECUs 4c, 4c, . . . in the group 2 is in the sleep impossible status "0" among the ECUs 4c, 4c, . . . connected to the communication line 3c.

Each of the distribution apparatuses 1a, 1b, 1c detects that all the ECUs 4a, 4a, . . . , 4b, 4b, . . . , 4c, 4c, . . . in the group 1 connected to the different communication lines 3a, 3b, 3c are in the sleep possible status as shown in FIG. 7.

Thus, each of the distribution apparatuses 1a, 1b, 1c sends a directive to perform an operation to change into the sleep mode toward the ECUs 4a, 4a, . . . , 4b, 4b, . . . , 4c, 4c, . . . in the group 1 connected via the communication lines 3a, 3b, 3c.

Figure 8:
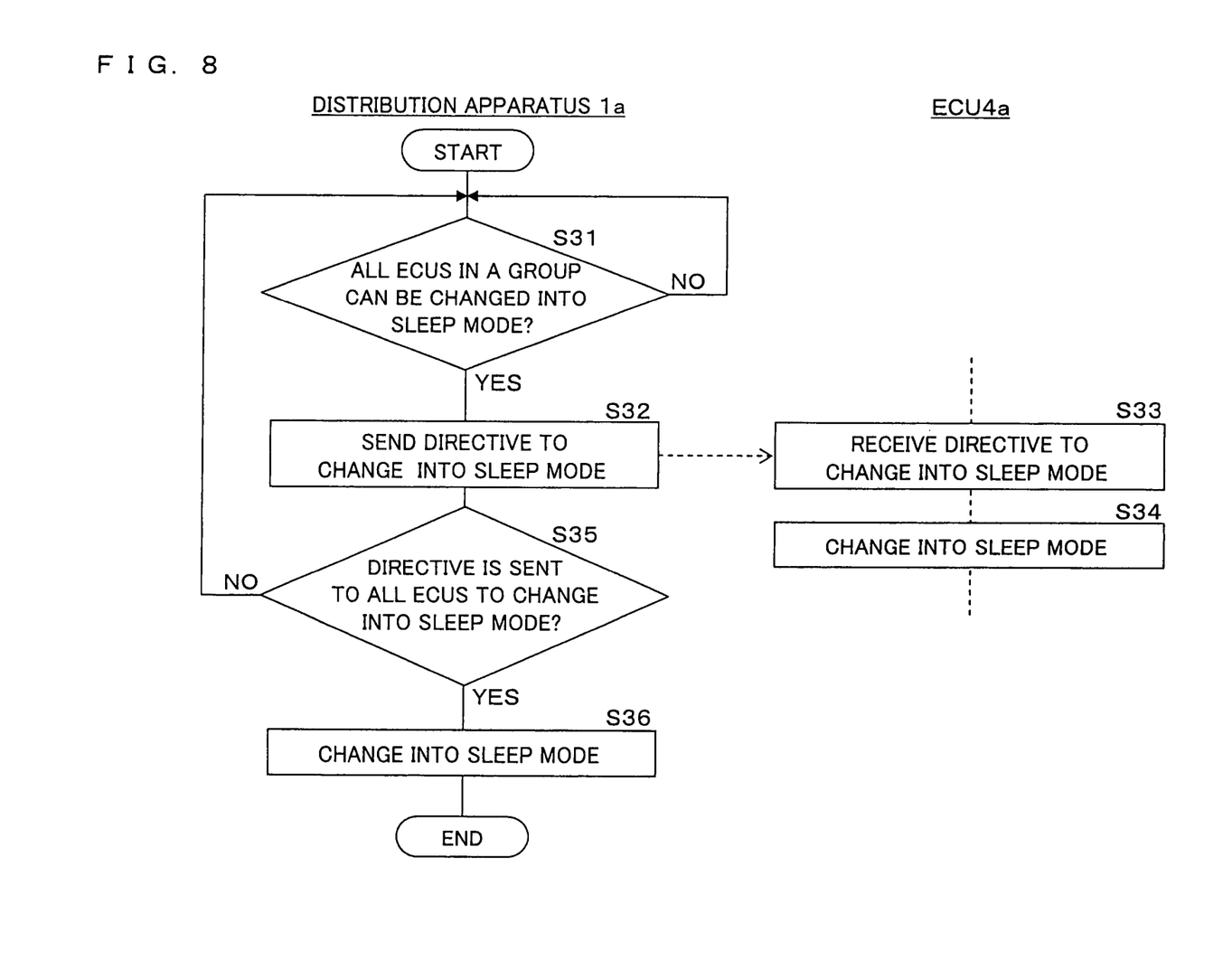
FIG. 8 is a flowchart showing one example of a procedure for sending a directive for each group to change ECUs into a sleep status by the control unit of the distribution apparatus included in the communication system adapting for car according to the embodiment.

FIG. 8 is a flowchart showing one example of a procedure for sending a directive for each group to change ECUs 4a, 4a, . . . , 4b, 4b, . . . , 4c, 4c, . . . into a sleep mode by the control unit 10a of the distribution apparatus 1a included in the communication system adapting for car according to the embodiment. This procedure is similar to those of the other control units 10b, 10c of the other distribution apparatuses 1b, 1c. Thus, these procedures of the other control units 10b, 10c of the other distribution apparatuses 1b, 1c will not be explained in detail.

The control unit 10a of the distribution apparatus 1a determines for each group whether all the ECUs 4a, 4a, . . . , 4b, 4b, . . . , 4c, 4c, . . . in first group can be changed into the sleep mode or not, on the basis of the status information of the ECUs 4a, 4a, . . . , 4b, 4b, . . . , 4c, 4c, . . . in all the groups obtained through the synchronizing operation (step S 31). When having determined that at least one of the ECUs 4a, 4a, . . . , 4b, 4b, . . . , 4c, 4c, . . . in the first group cannot be changed into the sleep mode (S31: NO), the control unit 10a returns the procedure to the step S31, and determines for a second group.

When having determined that all the ECUs 4a, 4a, . . . , 4b, 4b, . . . , 4c, 4c, . . . in the first group can be changed into the sleep mode (S31: YES), the control unit 10a sends a directive to change into the sleep mode toward the ECUs 4a, 4a, . . . , 4b, 4b, . . . , 4c, 4c, . . . in the first group connected via the communication line 3a (step S32).

At this time, each control unit 40 of the ECUs 4a, 4a, . . . receives the directive to change into the sleep mode from the distribution apparatus 1a (step S33), and then changes into the sleep mode in order to conform to the directive (step S 34).

Next, the control unit 10a of the distribution apparatus 1a determines whether the directive to change into the sleep mode is sent to the all ECUs 4a, 4a, . . . , 4b, 4b, . . . , 4c, 4c, . . . in all the groups or not (step S35). When having determined that the directive is not sent to the all ECUs 4a, 4a, . . . , 4b, 4b, . . . , 4c, 4c, . . . in all the groups (S35: NO), the control unit 10a returns the procedure to the step S31, and determines for another group.

When having determined that the directive is sent to the all ECUs 4a, 4a, . . . , 4b, 4b, . . . , 4c, 4c, . . . in all the groups (S35: YES), the control unit 10a makes own operation status become in a sleep mode (step S36) and completes the procedure, because it is allowable to stop the synchronizing operation on the ground that all the ECUs 4a, 4a, . . . , 4b, 4b, . . . , 4c, 4c, . . . will change into the sleep mode.

As shown in the flowchart of FIG. 8, the control unit 10a of the distribution apparatus 1a sends the directive to change into the sleep mode toward the ECUs 4a, 4a, . . . , 4b, 4b, . . . , 4c, 4c, . . . in all the groups and makes own operation status become in the sleep mode, when the ECUs 4a, 4a, . . . , 4b, 4b, . . . , 4c, 4c, . . . in all the groups are in the status being possible to change into the sleep mode. Thus, it is possible to solve the problem that the ECUs 4a, 4a, . . . , 4b, 4b, . . . , 4c, 4c, . . . to be interacted with together cannot interact together because each of the ECUs 4a, 4a, . . . , 4b, 4b, . . . , 4c, 4c, . . . to be interacted together cannot detect the operation status of other ECUs 4a, 4a, . . . , 4b, 4b, . . . , 4c, 4c, . . . connected to other communication lines 3a, 3b, 3c on the ground that each of the ECUs 4a, 4a, . . . , 4b, 4b, . . . , 4c, 4c, . . . to be interacted together are connected to the different communication lines 3a, 1b, 3c and are connected with the different distribution apparatuses 1a, 1b, 1c. Therefore, it is possible to efficiently transmit data between the ECUs 4a, 4a, . . . , 4b, 4b, . . . , 4c, 4c, . . . by providing the distribution apparatuses 1a, 1b, 1c. Furthermore, it is possible to make each of the ECUs 4a, 4a, . . . , 4b, 4b, . . . , 4c, 4c, . . . interact with together, even when duty for data transmission must be reduced.

In the past, each of the ECUs 4a, 4a, . . . , 4b, 4b, . . . , 4c, 4c, . . . cannot control other ECUs 4a, 4a, . . . , 4b, 4b, . . . , 4c, 4c, . . . connected to the different communication lines 3a, 3b, 3c in accordance with the operation status of those other ECUs 4a, 4a, . . . , 4b, 4b, . . . , 4c, 4c, . . . . In addition, the distribution apparatus 1a, 1b, 1c in the past cannot automatically change into the sleep mode, because the distribution apparatus 1a, 1b, 1c cannot detect each status of the ECUs 4a, 4a, . . . , 4b, 4b, . . . , 4c, 4c, . . . connected to different communication lines 3a, 3b, 3c and cannot determine whether it is possible to stop the synchronizing operation or not. On the other hand, in the embodiment, the ECUs 4a, 4a, . . . , 4b, 4b, . . . , 4c, 4c, . . . connected to different communication lines 3a, 3b, 3c can interact with each other, and the communication system adapting for car can automatically change into the sleep mode as a whole, through the operations described above. Therefore, these configurations lead advantages to save electric power consumption of the communication system adapting for car.

Next, it will be explained about a procedure that the communication system adapting for car changes into a wakeup mode as a whole after being in the sleep mode described above.

Figure 9:
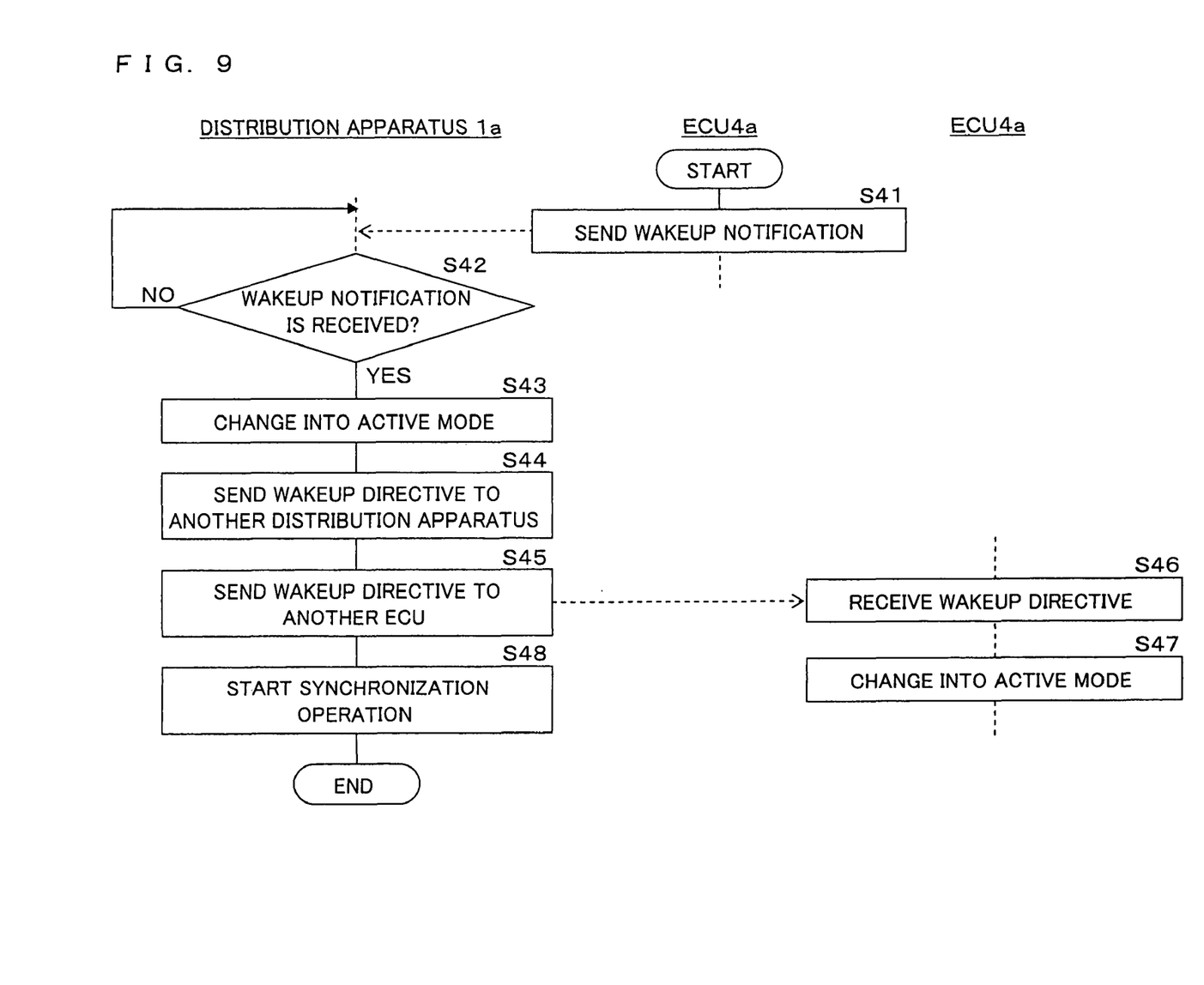
FIG. 9 is a flowchart showing one example of a procedure for changing the ECU into a wakeup status and distribution apparatus into a wakeup situation by the control unit of another distribution apparatus included in the communication system adapting for car according to the embodiment.

FIG. 9 is a flowchart showing one example of a procedure for changing the ECUs 4a, 4a, . . . , 4b, 4b, . . . , 4c, 4c, . . . into an active mode and distribution apparatuses 1b, 1c into an active mode by the control unit 10a of distribution apparatuses 1a included in the communication system adapting for car according to the embodiment. This procedure is similar to those of the other control units 10b, 10c of the other distribution apparatuses 1b, 1c. Thus, these procedures of the other control units 10b, 10c of the other distribution apparatuses 1b, 1c will not be explained in detail.

For example, when switching on of a switch connected to an ECU 4a is configured to trigger the change of the ECU 4a into the active mode, a control unit 40 of an ECU 4a detects switching on, the ECU 4a is changed into the active mode, and then the control unit 40 of the ECU 4a sends to the distribution apparatus 1a a wakeup notification (start-activation notification) that is one of the status notification (step S41).

The control unit 10a of the distribution apparatus 1a determines whether the wakeup notification is received from at least one of the ECUs 4a, 4a, . . . connected through the communication line 3a or not (step S42). When the control unit 10a has determined that the wakeup notification is not received (S43: NO), the control unit 10a returns the procedure to the step S42, and waits with keeping the sleep mode until having determined that the wakeup notification is received.

When the control unit 10a has determined that the wakeup notification is received (S42: YES), the control unit 10a changes own status into the active mode (step S43) and sends a wakeup directive to another distribution apparatus (step S44). The control unit 10a further sends a wakeup directive to the other ECUs 4a, 4a, . . . in order to change into the active mode (step S45).

At this time, each control unit 40 of the other ECUs 4a, 4a, . . . receives the wakeup directive sent from the distribution apparatus 1a (step S46), and changes own status into the active mode while conforming to the wakeup directive (step S47).

Next, the control unit 10a of the distribution apparatus 1a starts the synchronizing operation for the databases 11a, 11b, 11c between the distribution apparatus 1a and the other distribution apparatuses 1b, 1c that are changed into the active mode (step S48). Then, the control unit 10a completes the procedure to change a whole system into the wakeup mode.

Additionally, the control unit 10a of distribution apparatus 1a may determines whether the distribution apparatus 1a should be changed into the active mode or not, not only on the basis of the presence or absence of the wakeup notification received from the ECUs 4a, 4a, . . . at the step S42, but also on the basis of the presence or absence of the received data that is transmitted from the ECU 4a changed into the active mode, or on the basis of the presence or absence of the received wakeup directive that is transmitted from other distribution apparatuses 1b 1c or external.

In these configurations, it is possible to make the communication system adapting for car including the distribution apparatuses 1a, 1b, 1c and the ECUs 4a, 4a, . . . , 4b, 4b, . . . , 4c, 4c, . . . interact as a whole system and automatically change into the wakeup mode through the procedure performed by the control unit 10a of the distribution apparatus 1a as shown in the flowchart of FIG. 9, when at least one of the ECUs 4a, 4a, . . . , 4b, 4b, . . . , 4c, 4c, . . . connected to the different communication lines 3a, 3b, 3c is changed into the active mode and starts an operation.

The communication system in the embodiment is illustrated that the distribution apparatuses 1a, 1b, 1c are connected together in daisy chain topologies. Furthermore, the order of the data transmission in the embodiment between the distribution apparatuses 1a, 1b, 1c for synchronization is illustrated as a loopback method that the data constellation is transmitted from the distribution apparatus 1a, the distribution apparatus 1b receives and sends the data constellation transmitted from the distribution apparatus 1a after overwriting own data constellation region to renew, the distribution apparatus 1c receives and sends the data constellation sent from the distribution apparatus 1b after overwriting own data constellation region to renew, and then the data sent from the distribution apparatus 1c is transmitted back to the distribution apparatus 1b and then to the distribution apparatus 1a. However, it should be noted that this invention is not limited to these configurations. The distribution apparatuses 1a, 1b, 1c may be connected together in bus topologies. Every time of the periodical interval of synchronization, each of the distribution apparatuses 1a, 1b, 1c may sequentially select data constellation divided for each group among the data stored in own database 11a, 11b, 11c and send to another distribution apparatus 1a, 1b, 1c.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A relay apparatus comprising:
   a plurality of external units;
   a receiving unit that receives data from an external unit among the plurality of external units;
   a sending unit that sends the received data to another external unit among the plurality of external units;
   a sleep determining unit that determines, in accordance with the received data for notifying, whether it is possible to make the external unit be in a sleep status or not; and
   a sleep directive sending unit that sends a directive for leading the sleep status to the external unit when the sleep determining unit has determined that it is possible to make the external unit become in a sleep status, wherein
   when the receiving unit has received data for notifying an operation status of the external unit, the sending unit sends outside data representing the operation status of the external unit, in accordance with the received data for notifying, and
   when the sleep determining unit has determined that it is possible to make plural external units among the plurality of external units become in the sleep status, the sleep directive sending unit sends the directive for leading the sleep status to the plural external units.

2. A relay apparatus according to claim 1, further comprising:
   an action directive determining unit that determines in accordance with the received data for notifying whether a directive for leading an action should be sent to one or more external units among the plurality of external units or not.

3. A relay apparatus according to claim 2, further comprising:
   an activation directive sending unit that sends outside a directive for activating, in accordance with the received data for notifying.

4. A relay apparatus according to claim 2, further comprising:
   an activation directive sending unit that sends outside a directive for activating, in accordance with the received data for notifying.

5. A relay apparatus according to claim 2, further comprising:
   a self sleep making unit that makes the replay apparatus become in a sleep mode, when the sleep directive sending unit has sent the directive for leading the sleep status.

6. A relay apparatus according to claim 5, further comprising:
   an activation directive sending unit that sends outside a directive for activating, in accordance with the received data for notifying.

7. A relay apparatus according to claim 1, further comprising:
   an activation directive sending unit that sends outside a directive for activating, in accordance with the received data for notifying.

8. A relay apparatus according to claim 1, further comprising:
   a self sleep making unit that makes the replay apparatus become in a sleep mode, when the sleep directive sending unit has sent the directive for leading the sleep status.

9. A relay apparatus according to claim 8, further comprising:
   an activation directive sending unit that sends outside a directive for activating, in accordance with the received data for notifying.

10. A relay apparatus according to claim 1, further comprising:
    an activation directive sending unit that sends outside a directive for activating, in accordance with the received data for notifying.

11. A relay apparatus comprising:
    a plurality of external units;
    a receiving means for receiving data from an external unit among the plurality of external units;
    a sending means for sending the received data to another external unit among the plurality of external units;
    a sleep determining unit that determines, in accordance with the received data for notifying, whether it is possible to make the external unit be in a sleep status or not; and
    a sleep directive sending unit that sends a directive for leading the sleep status to the external unit when the sleep determining unit has determined that it is possible to make the external unit become in a sleep status, wherein
    when data for notifying an operation status of the external unit has been received by the receiving means, data representing the operation status of the external unit is sent outside by the sending means, in accordance with the received data for notifying, and
    when the sleep determining unit has determined that it is possible to make plural external units among the plurality of external units become in the sleep status, the sleep directive sending unit sends the directive for leading the sleep status to the plural external units.

12. A communication system comprising:
    a plurality of external devices; and
    a plurality of relay apparatuses, wherein
    each replay apparatus:
    is connected to plural external devices among the plurality of external devices; and
    comprises:
    a receiving unit that receives data from an external device among the plural external devices;

a sending unit that sends the received data to another external device among the plural external devices;

a sleep determining unit that determines, in accordance with the received data for notifying, whether it is possible to make the external device be in a sleep status or not; and a sleep directive sending unit that sends a directive for leading the sleep status to the external device when the sleep determining unit has determined that it is possible to make the external device become in a sleep status, wherein when the receiving unit has received data for notifying an operation status of the external device, the sending unit sends data representing the operation status of the external device, in accordance with the received data for notifying, to another relay apparatus among the plurality of relay apparatuses, and when the sleep determining unit has determined that it is possible to make plural external devices among the plurality of external devices become in the sleep status, the sleep directive sending unit sends the directive for leading the sleep status to the plural external devices.

13. A communication system comprising:
a plurality of external devices; and
a plurality of relay apparatuses, wherein
each replay apparatus:
is connected to plural external devices among the plurality of external devices; and
comprises:
a receiving means for receiving data from an external device among the plural external devices;
a sending means for sending the received data to another external device among the plural external devices;
a sleep determining unit that determines, in accordance with the received data for notifying, whether it is possible to make the external device be in a sleep status or not; and
a sleep directive sending unit that sends a directive for leading the sleep status to the external device when the sleep determining unit has determined that it is possible to make the external device become in a sleep status, wherein when data for notifying an operation status of the external device has been received by the receiving means, data representing the operation status of the external device is sent by the sending means, in accordance with the received data for notifying, to another relay apparatus among the plurality of relay apparatuses, and when the sleep determining unit has determined that it is possible to make plural external devices among the plurality of external devices become in the sleep status, the sleep directive sending unit sends the directive for leading the sleep status to the plural external devices.

14. A communication method for a communication system having a plurality of relay apparatuses connected with each other, each of which is connected to a plurality of external devices, comprising steps of:

by each of the plurality of external devices, sending data for notifying an operation status of the each of the plurality of external devices itself to the relay apparatus connected to the each of the plurality of external devices;

by each of the plurality of relay apparatuses, receiving the data for notifying and sending data, corresponding to the received data and representing the operation status of the external device by which the received data for notifying has been sent, to another relay apparatus; and by each of the plurality of relay apparatuses, determining in accordance with the data representing the operation status sent by another relay apparatus whether a sleep directive for leading a sleep status should be sent to one or more external devices among the plurality of external devices or not, and sending the sleep directive for leading sleep status to the one or more external devices when it has been determined that the sleep directive should be sent.

\* \* \* \* \*